United States Patent [19]
McGee

[11] 3,746,361
[45] July 17, 1973

[54] INDIVIDUAL COIL SPRING TANDEM SUSPENSION

[75] Inventor: Donald J. McGee, Troy, Mich.

[73] Assignee: Dura Corporation, Southfield, Mich.

[22] Filed: Aug. 31, 1970

[21] Appl. No.: 68,386

[52] U.S. Cl. .................. 280/104.5 R, 267/15 R
[51] Int. Cl. .................. B60g 19/02, B60g 19/08
[58] Field of Search .............. 280/104.5 R, 104.5 A

[56] References Cited
UNITED STATES PATENTS
1,388,405    8/1921    Clapp ..................... 280/104.5 R
2,869,889    1/1959    Dickison .................. 280/104.5 R
2,767,999    10/1956   Gouirand ................. 280/104.5 R Primary Examiner—Philip Goodman
Attorney—Benjamin H. Sherman and Charles T. Meroni et al.

[57] ABSTRACT

This invention relates to a suspension for tandem axles of a truck or trailer. A pair of beams are journaled on a common trunnion. On one end of each beam a vertically flexible member depends downwardly into contact with the upper portion of the other beam intermediate one end of the other beam and the trunnion. Both flexible members are simultaneously flexed at both ends during increase of load on the suspension and traversal of irregularities on the road.

14 Claims, 3 Drawing Figures

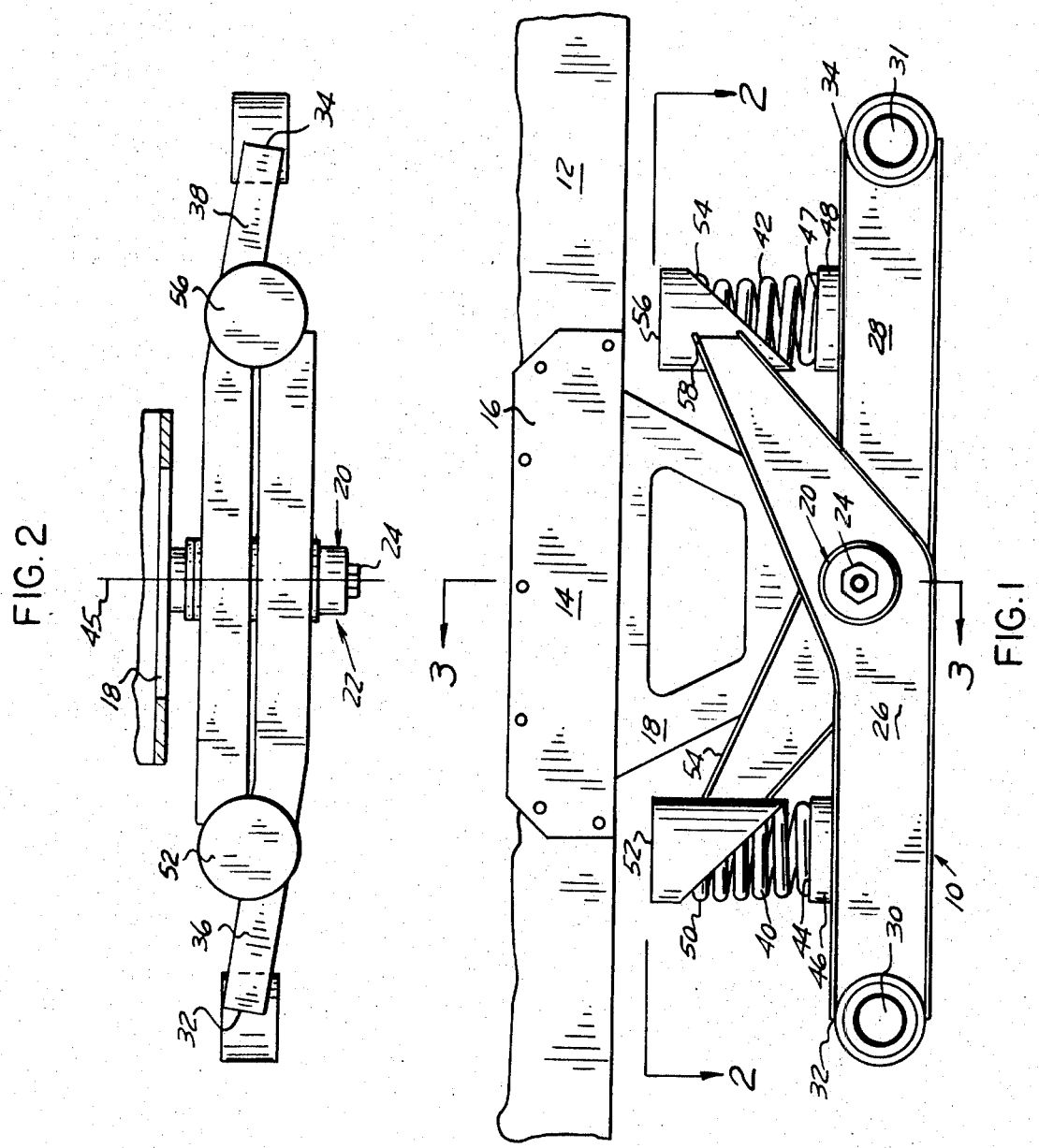

INDIVIDUAL COIL SPRING TANDEM SUSPENSION

This invention relates generally to suspensions for motor vehicles and trailers and the like. More specifically, this invention relates to suspensions for motor vehicles or trailers having tandem axles. The resilient members of this suspension comprises a pair of air bags or coil springs. A pair of beams, one the mirror image of the other, are commonly journaled near their midpoints. Each of the resilient members depends vertically downwardly from one end of one of the beams, and depends upwardly midway between the other end of the other beam and the common journaling.

In trucks and trailers carrying substantially heavy loads, it is necessary to provide, in the past, resilient members of suspensions used on such trucks or trailers that have a relatively high spring rate. But by using resilient members that have a high spring rate, the suspension is not substantially resiliently responsive to small bumps in navigation of roads.

Another difficulty encountered in the prior art of suspensions for use on trucks or trailers has been the necessity of maintaining one end of a resilient member used in the suspension system at a substantially constant position while the other end of the resilient member is flexed upon application of load or removal of load from the suspension system. This results in a displacement of the resilient member that is substantially less than the displacement of a non-resilient member during variations of load applied to the vehicle, traversal of irregularities in the road, or other oscillations imposed by variation of forces on the suspension system.

This difficulty raises the requirements for the strength weight, and spring rate of the resilient members in such systems. These additional requirement not only add cost and weight to the total suspension system, as well as the decreasing the response to small changes of forces on the system, but in addition, raise the fundamental of frequency of oscillation caused by vibrations on the suspension system experienced in the field.

Still another difficulty experienced in the prior art in suspension systems is the difficulty of maintaining equal load distribution when acceleration or braking loads are applied to the suspension system, as well as during the traversal of irregularities in the road. This is particularly true for tandem axles. This fact can be appreciated when forces are considered on the suspension system when wheels on a first axle are raised due to a traversal of a bump while the wheels on the second axle have not yet been raised.

Still another difficulty in suspension systems experienced in the prior art is the tendency of suspension systems applied to tandem axles to experience breathing. More specifically, this phenomenon relates to suspension systems in which beams on which axles are linked and which are journaled on a common trunnion tend to rotate into a "v" pattern rather than a straight line passing between the center of the two axles and the trunnion. This breathing causes extraordinary loads on the suspension system requiring heavier resilient members in such a suspension system that have a higher spring rate.

Still another difficulty experienced in suspensions in the prior art is the phenomenon of a variable moment arm on non-resilient members connecting an axle of a tandem axle to a common trunnion tube during axle wind up. This phenomenon can be appreciated when acceleration or braking load are applied to one of the axles of a tandem set.

It is an object of this invention to overcome each of the aforementioned difficulties with a new combination of resilient and non-resilient members in a suspension system.

These and other objects are accomplished by the provision of J-shaped beams commonly journaled on a trunnion tube fixed by a bracket to the frame of the vehicle. These beams are substantially rigid. However, they are free to rotate about the trunnion tube. Members, that are flexable in a vertical plane, entend from the end of one of the J-shaped beam members to a point on the opposite end of the other of the J-shaped beam members. Axles are fixed on the said other end of each of the beam members. When forces on the suspension system cause the first beam member to rise, an upward force is exerted on the resilient member near this other end. However, the resilient member cannot raise because of the force exerted at the other end of the resilient member by the other beam member. Consequently, the resilient member is squeezed between the ends of the two beams. Because the deflection of the resilient member in a vertical plane is substantially equal to the deflection of the first beam from a normal horizontal position, a resilient member having a substantially lesser spring rate than otherwise required can be utilized.

Other objects of this invention will appear in the following description and appended claims, referring to the accompanying drawings forming a part of this specification.

ON THE DRAWINGS

FIG. 1 is a transverse view of the preferred embodiment of this invention;

FIG. 2 is a transverse sectional view of the apparatus shown in FIG. 1 taken along the sectional lines 2—2 thereof;

Figure 3:
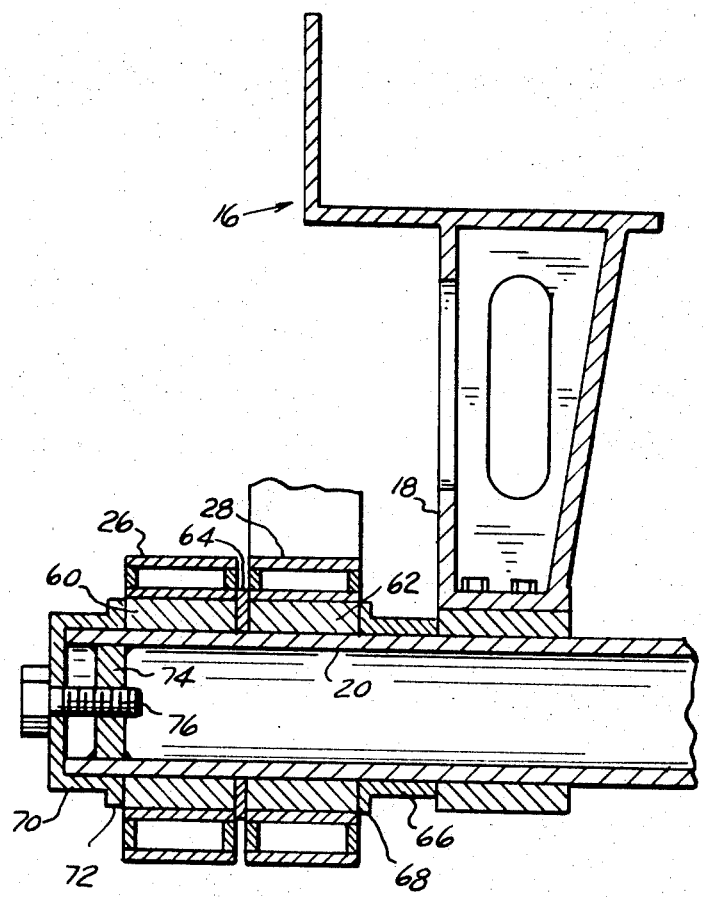

and FIG. 3 is a cross-sectional view of the apparatus shown in FIG. 1 taken along the sectional lines 3—3 thereof.

Before explaining the present invention in detail, it is to be understood that the invention is not limited in its application to the details in construction and arrangement of parts illustrated in the accompanying drawings since the invention is capable of other embodiments and of being practiced or carried out in various ways.

Also it is to be understood that the phraseology and terminology employed herein is for the purpose of description and not of limitation.

AS SHOWN ON THE DRAWINGS

FIG. 1 illustrates a preferred embodiment of this invention. The suspension is referred to generally at numeral 10. The suspension 10 is attached to the frame 12 of the vehicle by a bracket 14. Bracket 14 has a substantially L-shaped portion 16 and a vertically depending portion 18.

A trunnion tube, shown generally at numeral 20, is fixed to the bracket 18, extending horizontally outboard therefrom. Journaling means 22 is fixed to the trunnion tube 20 by securing means 24. Securing means comprises a cap bolt commonly used in the suspension art.

A pair of beam members 26 and 28 are journaled on the trunnion tube 20 by the journaling means 22. The journaling means 22 includes a rubber bushing, which has also been utilized in the prior art.

Beam members 26 and 28 are mirror images of one another. Each is somewhat J-shaped. They are commonly journaled on the trunnion tube 20 at their midpoint corresponding to the initial hook of the "J." Tandem axles 30 and 32 are fixed to beams 26 and 28, respectively, near the forward end 32 of beam 26 and aft end 34 of beam 28, respectively.

The tandem axles are fixed to the respective beams, each at a substantially equivalent outboard displacement from the center line of the vehicle. This is due to the inboard deflection 36 of beam 26 near its forward end 32 and the corresponding outboard deflection 38 of beam 28 near its end 34 respectively.

A pair of vertically yieldable members 40 and 42 are provided in this preferred embodiment of the invention. In the embodiment shown, these yieldable members are shown to be coil springs. However, they could also be air bags or other suitable vertically yielding members that can be compressed from both ends simultaneously.

Spring 40 is secured near its downward end 44 to beam portion 46 on beam 26. Beam portion 46 is located intermediate end 32 of beam 26 and the central axis 45 of the journaling of the beam members 26 and 28 about trunnion 20.

Spring 42 is secured near its end 47 to beam portion 48 on beam 28. Beam portion 48 is located intermediate axis 45 and the aft end 34 of beam 28.

The top end 50 of spring 40 is secured to beam portion 52 of beam 28. Beam portion 52 has a hollow frustro-conical shape. The spring 40 is contained within it. It is attached near the forward end 54 of beam 28.

The spring 42 is attached near its top portion 54 to beam portion 56 of beam 26. Beam portion 56 is a hollow frustro-conical shape that is the mirror image of beam portion 52. Beam portion 56 is secured to beam 26 near the aft end 58 thereof.

Referring to the details shown in FIG. 3, an appreciation of the relationship between the aforementioned elements of the invention can be appreciated where they are near the trunnion tube. Beam members 26 and 28 are journaled on trunnion tube 20. Rubber bushings 60 and 62 are provided for this purpose. They are concentric with the axis of trunnion tube 20. They are separated by a circular washerlike shim 64 that is secured to and concentric with trunnion tube 20.

A ring 66 is provided having a ledge portion 68 that abuts against rubber bushing 62. Ring 66 is concentric with and adjacent to trunnion 20. It abuts against bracket portion 18.

Securing means 24 comprises a cap 70 that has a ringlike abutting portion 72 concentric with and adjacently in contact with trunnion tube 20. The ring abuttment portion 72 of cap 70 abuts against the side of bushing 60.

Trunnion tube 20 has an interior disc portion 74 welded thereto and centrally threaded to receive a bolt 76. The bolt 76 secures cap 70 to the trunnion tube 20 in cooperation with fixed disc portion 74.

OPERATION

From the foregoing description of the structure of the preferred embodiment of this invention, it can be appreciated that when the truck or trailer, to which the tandem suspension is applied, is at rest or traveling over smooth ground and vibration free, a portion of the weight of the vehicle is imposed on the suspension system resulting in a downward force on trunnion tube 20 passing through and perpendicular to axis 45.

At this stage of operation, upward forces are exerted on the suspension to axles 30 and 31 near forward end 32 of beam 26 and aft end 34 of beam 28, respectively.

The upward force at end 32 of beam 26 tends to rotate beam 26 clockwise about axis 45. The force spplied near end 34 of beam 28 tends to rotate beam 28 anti-clockwise about axis 45.

The force applied at forward end 32 of beam 26 tends to raise the center of axle 30 above axis 45. The same is true os the upward force on end 34 of beam 28 in raising it above axis 45.

The rotation in a clockwise direction of beam 26 about axis 45 causes its aft end 58 to lower. This in turn causes a downward compressive force on spring 42.

The anit-clockwise rotation of beam 28 about axis 45 causes its forward end 54 to exert a downward compressive force on spring 40.

The clockwise rotation of beam 26 about axis 45 causes beam portion 46 to exert an upward compressive force on spring 40.

The anti-clockwise rotation of beam 28 about axis 45 causes beam portion 48 to exert an upward compressive force on spring 42.

From the foregoing description, it can be appreciated that when the vehicle is at rest or traveling over smooth ground that's substantially vibration free, the downward force of the weight of the vehicle on the spring in combination with the normal upward forces exerted by the axles on the suspension result in simultaneous compression at both ends of each of the springs. In the preferred embodiment of this invention, the spring rate of spring 40 and 42 can be chosen such that the centers of axles 30 and 31 are co-linear with the axis 45 when the vehicle is in the normal or vibration free condition.

It can be appreciated that in the normal, or smooth translation, or at rest and vibration free operation of the suspension, substantially equal to the force exerted by the truck on the suspension at the center of the suspension, perpendicular to and intersecting with axis 45.

It can also be appreciated that the co-linear relationship between the center of axle 30 and 31 with axis 45 can be chosen either at the tare weight of the vehicle, fully loaded weight, or at some intermediate load condition. However, regardless of which of these positions is chosen for the co-linear relationship referred to, it can be appreciated that due to the double compression of the springs resulting from the substantially equal upward normal forces on the axles, very little angular deflection from the horizontal co-linear position results at either extremum of full load or tare weight.

It can also be appreciated that when forces are exerted on the suspension wherein the upward normal forces on axles 30 and 31 are either not parallel or not equal, a uniform distribution of the load is nevertheless achieved. This can be appreciated from the following description of the operation of the suspension under such conditions.

When the motor vehicle to which the above suspension is applied first encounters an irregularity in a road, such as a bump, the type of disproportion between the normal forces exerted at axles 30 and 31 can be appreciated. When this occurs, axle 30 tends to rise above axle 31. This rising also induces a rotation of beam 26 about trunnion tube 20 or axis 45.

This rotation lowers end 58 of beam 26, causing a further downward compression of spring 42. The downward force on spring 42 results in increased further downward force on beam 28. This causes beam 28 to rotate in a clockwise sense.

The clockwise rotation of beam 28 raises forward end 54 of that beam. The raising of forward end 54 of beam 28 decreases the downward compression of spring 40. This decrease of downward compressive force on spring 40 tends to raise spring 40.

The clockwise rotation of beam 26 tends to increase the upward compressive force on spring 40 through beam portion 46, thus contributing to the raising of spring 40.

The clockwise rotation of beam 28 tends to decrease the upward compressive force on spring 42, thus encouraging spring 42 to lower.

From the immediately foregoing discussion, it can be appreciated that as a truck carrying the preferred embodiment of the suspension passes over a bump in the road, the elements of the suspension coacts as if they were a rigid body, and yet maintain substantially the same compressive forces in the springs 40 and 42. The latter fact expressed in the last mentioned phrase can be appreciated when considering that one side of each spring is relieving compressive strength while the other side is increased in compressive strength and that the amounts of respective decrease and increase are approximately equal.

From the foregoing description of structure and operation, it can be appreciated that a new type of suspension has been invented wherein the spring rate of the flexible members used in the suspension can be decreased because of the decrease of variation of load on these springs. By decreasing the spring rate, the fundamental frequency of oscillation during vibrations imposed on the suspension can be lowered. It can also be appreciated that a saving of weight is achieved by using less beefy springs, and that the wear and tear on the suspension substantially decreased by maintaining a uniform distribution of load on the suspension even during the traversal of irregularities in the road surface and during vibration imposed on the suspension.

I claim:

1. In a suspension for motor vehicles, the improvements comprising:
a bracket attached to the frame of the vehicle;
a trunnion tube fixed to said bracket and extending horizontally outwardly therefrom;
said trunnion tube having a central axle;
a pair of beams journaled on said trunnion tube about said central axis;
each of said beams having a portion extending forward of said central axis;
a vertically flexible member vertically disposed between said forward portions of said beams forward of said trunnion tube;
each of said beams having portions extending aft of said central axis;
a second vertically flexible member vertically disposed between said aft portions of said beam aft of said trunnion tube;
an axle attached to the forward portion of one of said beams;
an axle attached to the aft portion of the other said beams;
wherein the aft end of one of said beams is attached to the top portion of one of said vertically flexible members;
and the bottom of said one of said vertically flexible members is attached to the aft end of the other of said beam members intermediate said trunnion tube and the axle attached to said other of said beam members.

2. The apparatus of claim 1 wherein the end of the forward portion of said other beam is attached to the top of the other of said flexible members;
and the bottom of said other of said flexible members is attached to the forward portion of said one of said beam members intermediate the axle attached to said one of said beam members and the trunnion tube.

3. The apparatus of claim 1 wherein said vertically flexible members have substantially the same spring rate.

4. The apparatus of claim 1 wherein said vertically flexible members have substantially the same tensile strength.

5. The apparatus in claim 1 wherein said vertically flexible members have substantially the same compressive strength.

6. The apparatus in claim 1 wherein the length of the forward portion of one of said beams is equal to the length of the aft portion of the other of said beams.

7. The apparatus of claim 1 wherein the forward portion of one of said beams has substantially the same length between an axle attached thereto and the trunnion tube as the distance between the axle attached to the aft portion of the said other beams and the trunnion tube.

8. The apparatus of claim 1 wherein one of said flexible members is a coil spring.

9. The apparatus of claim 1 wherein both of said flexible members are coil springs.

10. The apparatus of claim 1 wherein one of said flexible members is an air bag.

11. The apparatus of claim 1 wherein both of said flexible members are air bags.

12. The apparatus of claim 1 wherein said beam members are journaled to said trunnion member by means of rubber bushings concentric with the said trunnion member.

13. The apparatus of claim 12 wherein said rubber bushings are separated by a ring-like metal shim concentric with and adjacently in contact with said trunnion tube.

14. The apparatus of claim 13 wherein said means journaling said beams to said trunnion tube are secured by means of a cap fixed to said trunnion tube and in abutting engagement with one of said rubber bushings.

* * * * *